3,189,467
PRESERVATION OF PERISHABLE PRODUCTS
Arthur F. Kalmar, Riverside, Calif., assignor to FMC Corporation, a corporation of Delaware
No Drawing. Filed Dec. 14, 1959, Ser. No. 859,138
10 Claims. (Cl. 99—168)

The present invention relates to the preservation of perishable products, such as fruits and vegetables, and more particularly to the prevention of fruit decay through the use of a fungicide.

In the past, fungicides have been employed for the prevention of fruit decay, being usually applied to the fruit packaging material, such as for example the tissue wraps, paper liners, or cardboard cartons ordinarily used. The fungicidal action has here resulted from vaporization of the fungicide and the consequent provision thereby of an atmosphere surrounding the fruit which will hinder mold growth. The fungicides diphenyl and orthophenylphenol have been employed in this connection. The efficiency of fungicidal control has however been limited, due to the fact that the fungicide has not been brought into direct contact with the surface of the fruit, nor has it been applied to the cuts and punctures in the fruit skin in which mold growth is very likely to occur.

Direct application of orthophenylphenol to the fruit skin has not been possible, since such application would result in severe staining or an injury to the skin, even if the orthophenylphenol is applied in amounts as small as 0.2% by weight in a solvent. Diphenyl has likewise not heretofore been directly applied to the fruit skin. If so applied, it would vaporize rapidly and dissipate into the surrounding atmosphere, so as to provide little control of mold growth during the normal market life of the fruit.

It is, therefore, an object of the present invention to provide an improved process for the preservation of fruits and vegetables.

Another object of the invention is to provide an improved process for the application of a fungicidal agent to fruits and vegetables.

Another object of the invention is to provide a process for the direct application to fruits and vegetables of the fungicides diphenyl and orthophenylphenol.

Another object of the invention is to provide an improved fungicidal coating for fruits and vegetables.

These and other objects of the invention will become apparent from the following description thereof.

In accordance with the present invention, a fungicidal agent selected from the group consisting of diphenyl, orthophenylphenol and mixtures thereof is incorporated along with a resin in a non-aqueous solvent, and the solution is applied to the surface of perishable products, such as fruits and vegetables. Although any means for application of the solution to the perishable product may be employed, the solution is preferably applied as a fine spray in the manner disclosed in Sharma U.S. Patent No. 2,212,621 and Sells et al. U.S. Patent No. 2,342,063.

As a result of its application directly to the surface of the fruit or vegetable, the fungicide acts in several ways. Firstly, there is direct contact thereof with the mold spores on said surface. Secondly, the fungicide vaporizes and diffuses into the cuts and punctures in the surface, and into other areas where there may not have been direct contact. There is also evidence that the fungicide diffuses through the waxy cutin of citrus fruit and into the peel tissue, thereby providing further protection against mold growth. The fungicide intimately contacts the mold spores, being uninhibited by an emulsifier which, if present, would prevent intimate contact thereof with the hydrophobic covering of the mold spores, and would also coat said mold spores, thus forming a barrier against the entrance of the fungicide thereinto.

The resin present in the solution along with the fungicide provides conditions of fungicidal action not possible when the fungicide is employed alone. In the case of orthophenylphenol, the combination thereof with the resin enables safe application to a fruit surface of as much as twenty-five times more thereof than would otherwise be possible, this agent being injurious to fruit skin when applied in as small amounts as 0.2% by weight in a petroleum solvent. A solution in an organic solvent of between 0.5% and 5.0% by weight orthophenylphenol is preferred. At least two parts of resin per part orthophenylphenol should be incorporated in the solution. The ratio of resin to orthophenylphenol, rather than the amount of coating applied to the fruit, has been found to be the critical factor. The resin appears to regulate the amount of orthophenylphenol which comes into intimate contact with the fruit surface at any one time, and thereby maintains the concentration of orthophenylphenol at said surface below a phytotoxic level.

In the case of solutions containing diphenyl, the combination of resin therewith has been found to result in considerably better mold control than when diphenyl is used alone. Here, the resin appears to regulate the release of the diphenyl from the solution, so that the latter slowly diffuses from the resin film at such rate as to produce a fungistatic "skin" of diphenyl vapor around the fruit, the presence of which skin may last for a considerable time, and thus increase the normal market life of the fruit. The solution here preferably has a concentration of between 1% and 10% by weight diphenyl. The resin should be present in the solution, in a concentration of between 1% and 20% by weight and in a ratio of not less than one part thereof per part diphenyl, the preferred ratio being 3 parts resin per part diphenyl.

The factors which will govern the particular concentration of fungicide selected within the above indicated ranges are the solubility of the fungicide in the particular resin solution employed; the phytotoxicity of the fungicide; the residue of fungicide on the fruit permitted by government regulation; the effect of the fungicide on the appearance, taste, and aroma of the fruit; and the economic factors involved. Approximately 10 p.p.m. of fungicide, based on the whole fruit weight, should usually be applied for a minimum degree of mold control.

The organic solvent employed for the solution of the fungicide and resin is preferably a petroleum distillate or an alcohol type solvent. If the coating is to be applied as a spray, a solvent having an initial boiling point of 100° F. and a final boiling point of 350° F. is preferred.

Representative resins which are suitable in the practice of the invention are the hydrocarbon terpines, polyindenes, coumarone indenes, phenolic resins, polymerized hydrocarbon resins, chlorinated paraffins, terpene phenolics, alkyds and polyamides. Rosin and rosin compounds and resins are also suitable.

The following examples and tables will illustrate the practice of the invention:

EXAMPLE I

A solution of resin and fungicide was prepared by dissolving 10% of the resin known commercially as Piccovar FM resin and 2% diphenyl in 88% of the petroleum solvent known commercially as SOCAL 100-L. The solution was applied to lemons by a spraying process such as disclosed in the aforementioned Sharma and Sells et al. patents, spray nozzles known commercially as #4.00 Monarch nozzles operating at 40 lbs. pressure being employed, the conveyor speed being 126 valleys per minute, and approximately 70 p.p.m. or 1.4 grams of coating per carton being deposited.

EXAMPLE II

A resin-fungicide solution was prepared following the method of Example I except that 2% of orthophenylphenol was used instead of diphenyl. The manner of application was the same as in Example I.

EXAMPLE III

A resin-fungicide solution was prepared following the method of Example I except that 2% of diphenyl and 2% of orthophenylphenol were dissolved in 86% of the solvent known commercially as SOCAL 100-L. The solution was applied as in Example I.

EXAMPLE IV

A resin-fungicide solution was prepared by dissolving 10% shellac and 2% diphenyl in 88% isopropyl alcohol. The solution was applied to apples under conditions as given in Example I.

EXAMPLE V

For comparison purposes, a solution of 10% Piccovar FM resin alone was dissolved in 90% SOCAL 100-L, and applied to lemons in the manner set forth in Example I.

The Piccovar FM resin, a coumarone-indene resin, has the following characteristics:

(1) Color (coal tar scale) _____ max__ 2
(2) Soft point, ° C. (ball and ring) _____ 158–165
(3) Resin mineral spirits solubility, ° C. _____ 98
(4) Specific gravity at 25/15.6 _____ 1.10
(5) Refractive index ($n^{20}/D$) _____ 1.62
(6) Molecular weight approximately _____ 800

Iodine numbers of the Piccovar FM resin by a variety of methods indicate a very low order of reactivity and the resin shows little unsaturation. The chemical structure of a coumarone-indene resin is as follows:

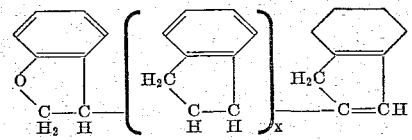

SOCAL is a registered trademark and SOCAL 100-L is a trade name for a petroleum solvent having the following characteristics from which the solvent can be made:

Gravity, ° API _____ 49.7
Aniline point, ° F. _____ 65.5
Kauri-butanol value _____ 57
Distillation, ASTM D-86 percent recovered, ° F.:
   Initial boiling point _____ 190
   5 _____ 200
   10 _____ 208
   20 _____ 214
   30 _____ 221
   40 _____ 228
   50 _____ 234
   60 _____ 240
   70 _____ 250
   80 _____ 260
   90 _____ 268
   95 _____ 272
   Dry point _____ 282
   End point _____ 302

Table I sets forth the results of tests illustrating the effectiveness of solutions prepared and applied in accordance with the examples in controlling mold growth at the surface of lemons.

Table I
SURFACE MOLD CONTROL—LEMONS, SIX CARTONS EACH

| Type of coating: | Percent mold after 13 days |
|---|---|
| Example V | 11.4 |
| Example I | 0.18 |
| Example II | 1.17 |

Table II sets forth test results comparing the effectiveness of solutions prepared and applied in accordance with the examples in controlling mold growth in lemons which have been injured and mold-inoculated.

Table II
SUBSURFACE MOLD CONTROL—LEMONS, SIX CARTONS EACH

| Type of coating: | Percent mold after 1 week |
|---|---|
| Example V | 98.0 |
| Example II | 18.4 |
| Example III | 6.2 |

As is apparent from the tables, solutions containing a resin and fungicide in accordance with the invention substantially limit mold growth such as would occur when solutions containing a resin alone are employed.

From the foregoing description it will be seen that the present invention provides a process by which diphenyl and orthophenylphenol can be effectively applied to fruit and vegetables. In the solution of the present invention the resin releases the fungicide at a controlled rate causing it to vaporize and surround the entire fruit surface with a protective atmosphere of perhaps molecular dimensions. This action of the resin in controlling and aiding the application of the fungicide is a decided improvement over the use of an aqueous medium whose emulsifier actually coats the mold spores of the fruit and forms a barrier which prevents the entrance of the fungicide. Accordingly the use of a resin provides, for the first time, a medium by which diphenyl and orthophenylphenol can be effectively applied to fruit and vegetables.

The invention having thus been described, what is claimed as new and desired to be protected by Letters Patent is:

1. A process of preserving fruit consisting of contacting fruit with a non-aqueous solution consisting essentially of between about 1 percent and about 20 percent by weight of resin, between about 0.5 percent and about 5 percent by weight of orthophenylphenol, and a petroleum distillate solvent which will dissolve said resin and orthophenylphenol, said resin and said orthophenylphenol being present in a ratio of at least about two parts resin to about one part orthophenylphenol, the balance of said solution being said solvent.

2. A process of preserving fruit consisting of contacting fruit with a non-aqueous solution consisting essentially of between about 1 percent and about 20 percent by weight of resin, between about 1 percent and about 10 percent by weight of diphenyl, and an alcohol type solvent which will dissolve said diphenyl and resin, said resin and diphenyl being present in said solution in a ratio of at least about 1 part resin to about 1 part of said diphenyl, the balance of said solution being said solvent.

3. A non-aqueous solution for application as a preservative coating to fruit and vegetables consisting essentially of between about 1 percent and about 20 percent by weight of resin, between about 0.5 percent and about 5 percent by weight of orthophenylphenol, and a petroleum distillate solvent which will dissolve said resin and orthophenylphenol, said resin and said orthophenylphenol being present in a ratio of at least about two parts resin to about one part orthophenylphenol, the balance of said solution being said solvent.

4. A non-aqueous solution for application as a preservative coating to fruit and vegetables consisting essentially of between about 1 percent and about 20 percent by weight of resin, and between about 1 percent and about 10 percent by weight of diphenyl, said resin and diphenyl being dissolved in an alcohol type solvent capable of dissolving said resin and diphenyl, said resin and diphenyl being present in said solution in a ratio of not less than about 1 part resin to about 1 part of said diphenyl, the balance of said solution being said solvent.

5. A preservative coating for fruit and vegetables consisting essentially of a non-aqueous solution containing between about 0.5 percent and about 5 percent by weight of orthophenylphenol and between about 1 percent and about 20 percent by weight of resin, said orthophenylphenol and resin being dissolved in said solution.

6. A preservative coating for fruit and vegetables consisting essentially of a non-aqueous solution containing between about 1 percent and about 10 percent by weight of diphenyl and between about 1 percent and about 20 percent by weight of resin, said diphenyl and resin being dissolved in said solution.

7. A non-aqueous solution for application as a preservative coating to fruit and vegetables consisting essentially of between about 1 percent and about 20 percent by weight of resinous material, between about 1 percent to about 10 percent by weight of diphenyl, and between about 0.5 percent to about 5 percent by weight of orthophenylphenol, said resinous material, diphenyl and orthophenylphenol being dissolved in a solvent selected from the group consisting of petroleum distillate and alcohol type solvent, the diphenyl and orthophenylphenol being present in ratios of at least about 1 part resin to about 1 part diphenyl and at least about 2 parts resin to about 1 part orthophenylphenol, the balance of said solution being said solvent.

8. A process for enabling intimate contact of fungicide with the surface of fruit and vegetables which it is desired to preserve, said surface including mold spores and their hydrophobic coverings, consisting essentially of applying on said surface a non-aqueous solution consisting essentially of a fungicide, resinous carrier for said fungicide, and a nonaqueous volatile organic solvent capable of dissolving said carrier and fungicide, said fungicide and carrier being dissolved in said solvent, the ratio of carrier to fungicide being such as to enable the fungicide to be controllably released from said carrier so as to vaporize around said surface, said fungicide being uninhibited by an emulsifier which, if present, would prevent intimate contact of said fungicide with the hydrophobic covering of the mold spores and would also coat said mold spores thereby forming a barrier against the entrance of the fungicide thereinto, said fungicidal vapor thereby directly contacting said mold spores and their hydrophobic coverings.

9. A preservative composition for application to the surface of fruits and vegetables having mold spores consisting essentially of a solution of resin and fungicide selected from the group consisting of diphenyl, orthophenyphenol and mixtures thereof and dissolved in non-aqueous solvent capable of dissolving said resin and fungicide, the ratio of carrier to fungicide being such as to enable the fungicide to be controllably released from said resinous carrier so as to vaporize around and intimately contact said spores, said fungicide being uninhibited by the presence of an emulsifier, which, if present, would prevent said intimate contact.

10. A preservative composition for application to the surface of fruit and vegetables which it is desired to preserve, said surface including mold spores over which barriers to the entry of fungicide can be formed if emulsifiers are applied to said surface, said composition comprising a non-aqueous solution including vaporizable fungicide, resinous carrier for said fungicide, and non-aqueous volatile organic solvent capable of dissolving said resinous carrier and fungicide, the ratio of carrier to fungicide being such as to enable the fungicide to be controllably released from said resinous carrier so as to vaporize around and intimately contact said spores, said fungicide being uninhibited by an emulsifier which, if present, would prevent said intimate contact.

References Cited by the Examiner
UNITED STATES PATENTS

| 1,943,468 | 1/34 | Bridgeman | 99—168 |
| 2,128,973 | 9/38 | Tisdale el al. | 99—168 X |
| 2,213,557 | 9/40 | Tisdale et al. | 99—168 |
| 2,469,914 | 5/49 | Bridgeman | 99—168 |
| 2,710,849 | 6/55 | Siggel | 260—33.6 X |

A. LOUIS MONACELL, *Primary Examiner.*

ABRAHAM H. WINKELSTEIN, HYMAN LORD, *Examiners.*